E. C. WALTER.
COMPUTING MACHINE.
APPLICATION FILED SEPT. 11, 1916.

1,362,549.

Patented Dec. 14, 1920.
4 SHEETS—SHEET 1.

Witnesses
Philip E. Barnes
Frank A. Kane

Inventor
Edward C. Walter
By Edmund H. Parry
Atty.

E. C. WALTER.
COMPUTING MACHINE.
APPLICATION FILED SEPT. 11, 1916.

1,362,549.

Patented Dec. 14, 1920.
4 SHEETS—SHEET 3.

Witness
Philip E. Barnes
Frank A. Kane

Inventor
Edward C. Walter
By Edmund H. Parry
Attorney

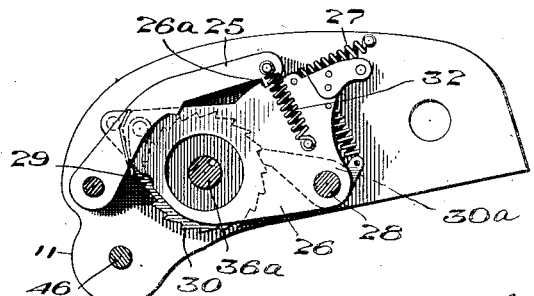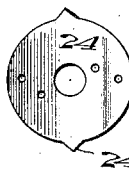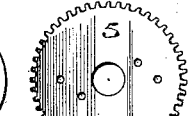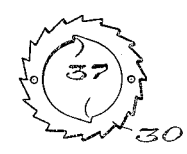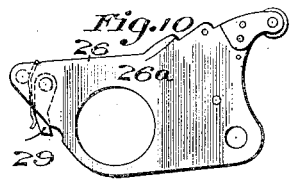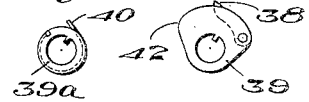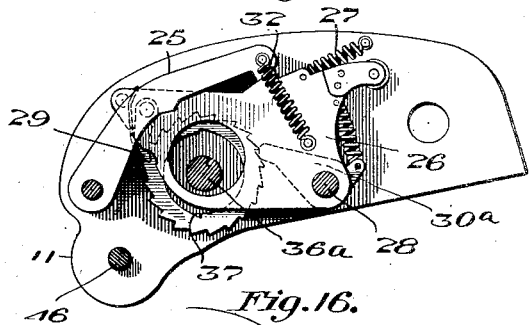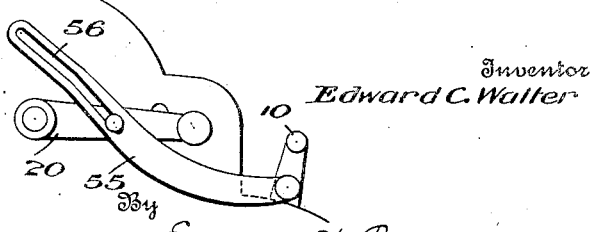

UNITED STATES PATENT OFFICE.

EDWARD C. WALTER, OF NEW YORK, N. Y., ASSIGNOR TO HARRY T. AMBROSE, OF ORANGE, NEW JERSEY.

COMPUTING-MACHINE.

1,362,549. Specification of Letters Patent. Patented Dec. 14, 1920.

Application filed September 11, 1916. Serial No. 119,500.

*To all whom it may concern:*

Be it known that I, EDWARD C. WALTER, a citizen of the United States, residing at New York, in the county of New York and State of New York, have invented certain new and useful Improvements in Computing-Machines, of which the following is a specification, reference being had therein to the accompanying drawing.

My invention relates broadly to computers and more particularly to calculating attachments for typewriters and has for its object to provide mechanism which is positive in action and of simple construction.

The present invention includes certain of the mechanism shown in my United States Patents Nos. 963,727, 1,224,872 and 1,295,396, respectively, in conjunction with certain other features and improvements.

An object of the invention is to provide means whereby the accumulation of a grand total may be accomplished at any columnar position.

Another object within the contemplation of the invention is to provide means whereby a total may be produced in the calculating machine and, when this total is destroyed therein, a corresponding amount will be transferred to mechanism in an accumulator which will then retain it or accumulate the amount of the total to amounts previously transferred.

Another object is to provide means for positioning the adding and subtracting control-lever into the adding position whenever the zero-producing mechanism of the calculating machine is operated.

Another object is to provide for the accumulator being placed in operative relation with the calculating machine, either before or after a selection has been made in the calculating machine.

Another object is to arrange for the zero-producing instrumentalities of the calculating attachment to cause the transfer from the calculating attachment to the accumulating machine of the particular amount as may at any instant be showing on the calculating attachment prior to the actuation of the zero-producing instrumentalities, and to release the accumulator so that the same will be moved out of operative relation with the calculating attachment.

Another object is to permit the zero-producing mechanism to produce zeros in the calculating attachment and, thus, effect a transfer to the accumulator either before or after a selection has been made in the calculating attachment.

Another object is to provide mechanism for returning the selecting mechanism to normal position without actuation of the calculating and accumulating instrumentalities when the accumulator is in coöperating relation with the calculating attachment.

Other objects and advantages are set forth in the following specification and will be apparent from the appended drawings.

The mechanisms embodied in the machines of the above-mentioned cases, briefly speaking, include in combination with a typewriter, calculating mechanism in which is produced the results of mathematical operations as controlled by the printing keys of the typewriter. When the keys thereof are depressed, a selecting of a particular denominational amount is effected in the calculating attachment. Should this amount be other than that desired, it may be destroyed without producing computation. In the event, however, that the selection is correct, it is transferred to the figure-wheels or rolls of the calculating attachment by means of a pull-handle or operating motor and, at the same time, this action restores the selecting mechanism to normal position so that another selective condition may be made thereon. These mechanisms may be set for either an additive or a subtractive computation, at the will of the operator. Means are provided whereby the figure-wheels or rolls will show or read zeros when said means are operated. When said means are operated, the calculating mechanism is operated in a subtractive direction.

Though the mechanism herein disclosed for the calculating attachment proper is substantially the same as revealed in my aforementioned prior cases, the timing and construction thereof have been altered to produce easier action, and certain parts have been eliminated, thus reducing the cost of manufacture.

The adjunctive mechanism herein shown as combined with said calculating attachment includes mechanism for accumulating or producing the total of a plurality of subtotals, and is controlled by direct engagement with the calculating attachment.

This type of device is of importance in machines where a plurality of registers or calculating attachments are used for, say, three columns, such as debits, credits and net sales. When the calculating attachment for the debit column has produced the total amount of a number of recorded items, this amount may be transferred to the accumulator of that column at the time that the amount on the calculating attachment is eliminated. This procedure is carried out in connection with the registers and accumulators of other columns, and this gives the total of a plurality of items in each column and accumulates the total of all of the columnar totals.

Many valuable and useful results may be produced by the combination of the two structures herein shown as operatively combined and related, as will be apparent to those skilled in the art.

One embodiment of the invention is illustrated in the accompanying drawings, in which.

Figure 1:
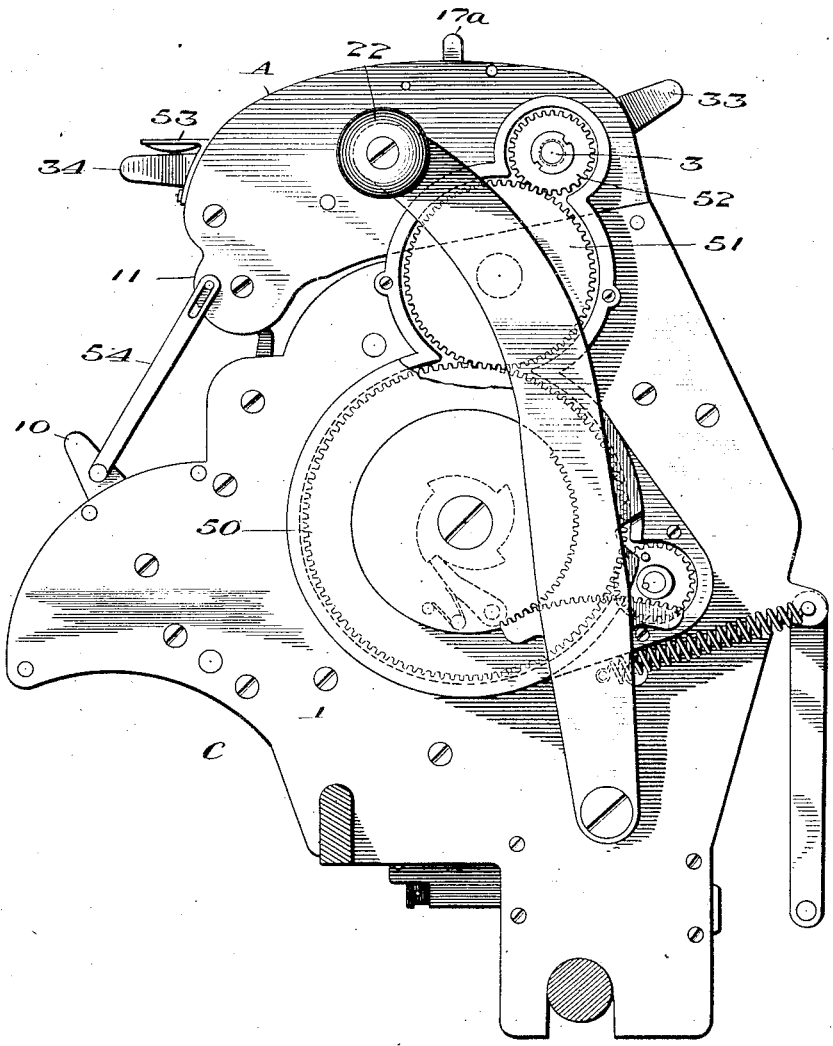
Figure 1 is a view in side elevation of the calculating attachment and accumulator, and shows the actuating connections between the same.
Figure 2:
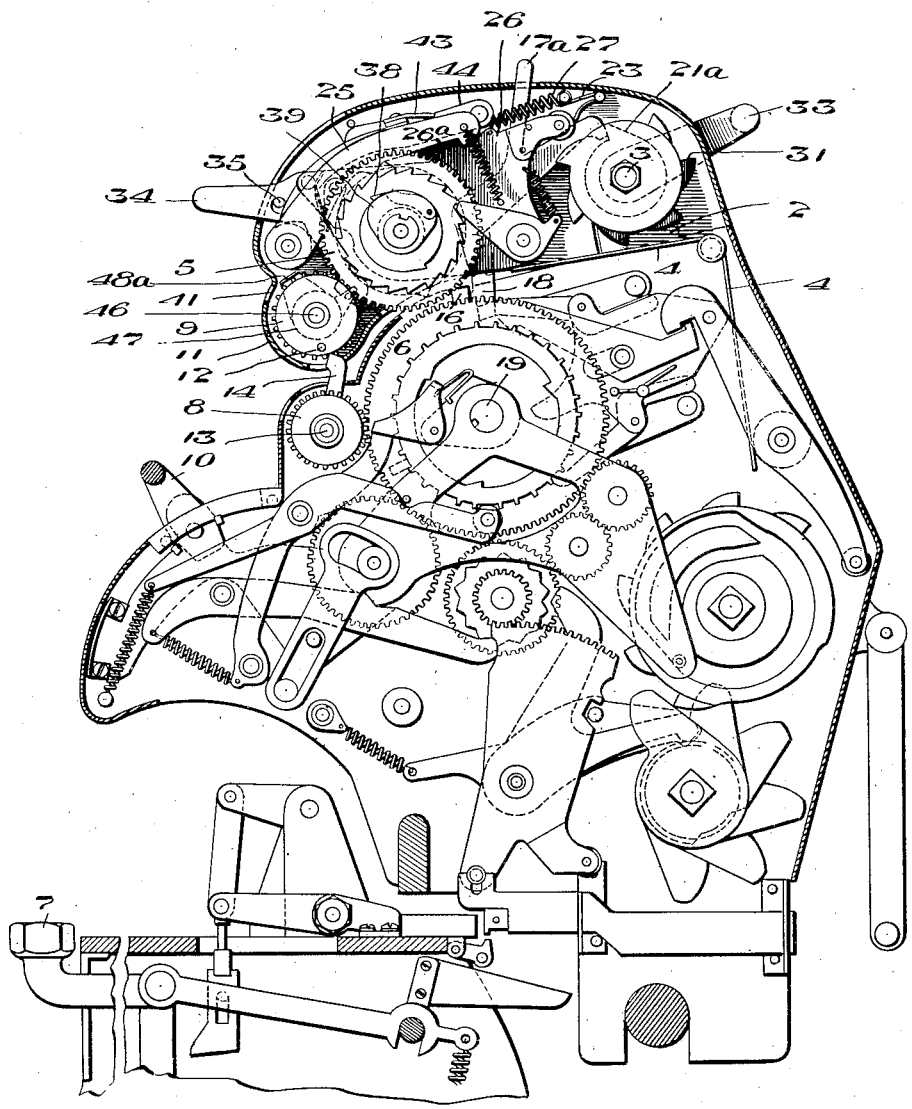
Fig. 2 is a view in side elevation thereof with parts of the casings removed and showing a typewriter-key and operating connections.

Figs. 4 to 15, inclusive, are views showing details of the accumulator; and

Fig. 16 is a detail view of the zero-producing element.

In these drawings, the reference-numeral 1 designates side-plates of the calculating attachment, marked C, and these are provided with projections 2 which act as bearings or supports for the accumulator, marked A, the latter fulcruming on a shaft 3, and being held in a raised position by springs 4.

*The accumulator.*—This includes a main gear 5 which is out of mesh with a main gear 6 of the calculating attachment when in its raised position. It is, however, in mesh with the same and is adapted to be moved thereby when in its lowered position. As already mentioned, the depression of a numeral key 7 of the typewriter causes a selection to be made in the calculating attachment equivalent in value to the units contained in the numerical value of the key. This selection is then transferred to a figure-wheel or roll 8 in the calculating attachment by the main gear 6. Therefore, if the selection be, say, of eight, the main gear 6 turns or rotates eight unit-spaces to cause the figure-wheels 8 to be moved the same amount. It will, therefore, be apparent that when the accumulator shall have been lowered to cause meshing of gears 6 and 5, and a selection is transferred to the figure-roll, its action or movement will be communicated to the gear 5 of the accumulator and, as the accumulator is similarly provided with figure-wheels or rolls 9 which mesh with its respective gear 5, its action will be communicated to the proper roll 9.

Figure 3:
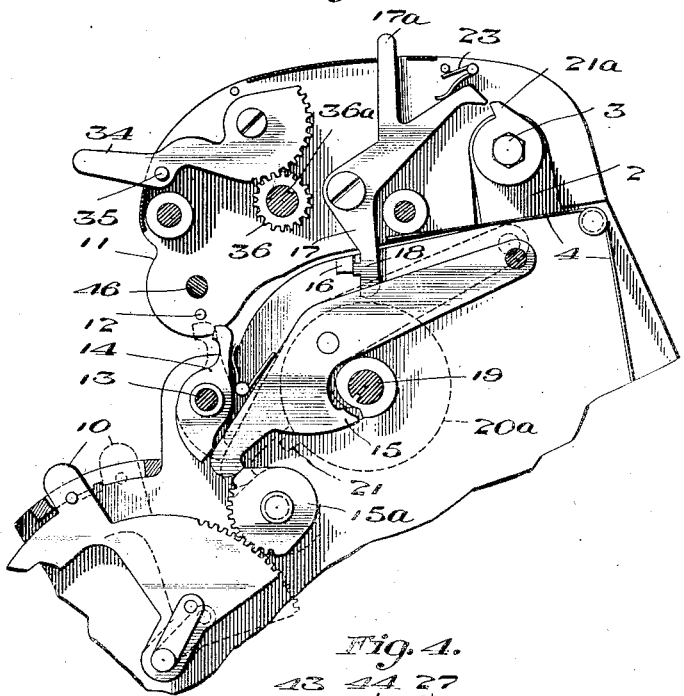
Fig. 3 is also a view in side elevation showing, in detail, parts of the calculating attachment and accumulator.
Figure 4:
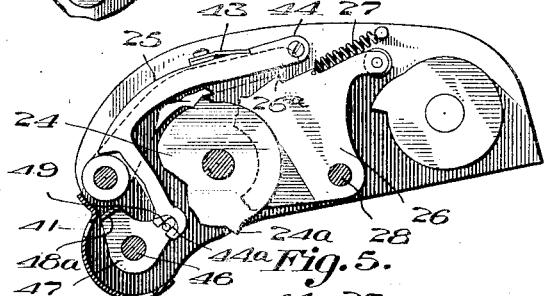
Figure 5:
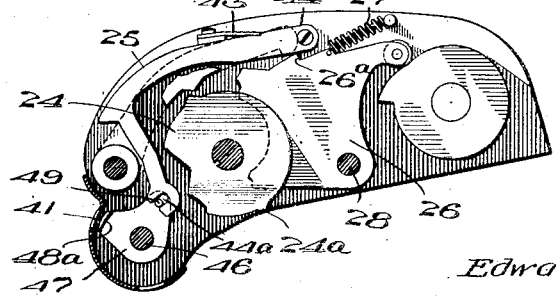

The main gear 6 rotates in one direction when addition is being performed and in the opposite direction when a subtractive computation is being effected, this opposite rotation of the gear being controlled by the positioning of a setting lever 10. When this lever is in the position shown in dotted lines, Fig. 3, additive computation will be performed by the calculating attachment and mechanism (to be described) will be set to prevent the accumulator from being placed in operative connection with the same. This mechanism is controlled by the adding and subtracting or setting lever 10 as follows: An accumulator-plate 11 is provided with a projection 12. Directly below but fulcrumed on a figure-roll shaft 13 of the calculating attachment is an arm 14 positionable (by the action of the lever 10, cam 15ª and a lever 15) into either of two positions, whereby the accumulator will be free to be positioned in mesh with gears of the calculating attachment when in one position—namely, that for subtracting—and being prevented from being depressed when the lever 10 is in the other or addition position.

Means are preferably provided for locking the accumulator in mesh with the calculating attachment when in its lowered position. These means are also operable to unlock or release the accumulator from the calculating attachment and allow the springs 4 to raise the same out of mesh therewith in three ways as will now be explained. The calculating attachment is provided with a projection 16 and the accumulator is provided with an arm 17 adapted (when the accumulator is lowered) to hook or latch under the projection 16. This arm is also provided with an upstanding extension 17ª which projects above the casing of the accumulator and affords means whereby a latch 18 may manually be operated to unlock the accumulator. A main gear shaft 19 of the calculating attachment is rotated when a zero-producer 20 of the calculating attachment is operated. Keyed to the shaft 19 is a disk 20ª provided with a projection 21 which will, when rotated, abut against the lower end of the lever or latch 18, and this action will cause the latch to be moved out of active engagement with the projection 16, thus leaving the accumulator free to be raised by the springs 4. The unlocking of the latch 18 takes place at the very last part of the movement of the zero-producer 20. The shaft 3 is provided with a cam 21ª which will cause the extension 17ª (which is part of the latch 18) to be moved every time a pull-handle 22 of the calculating attachment is operated. This shaft 3 is geared to the pull-handle mechanism in such manner as to make one revolution each time the handle is fully operated: Thus, it will be seen that if the accumulator is in operative mesh with the calculating attachment, it may be released therefrom, first, by pulling on the extension 17ª of the latch 18; secondly, by moving the zero-producer 20 as for producing zeros; and, thirdly, by operating the pull-handle. A spring 23 will move the latch, when free to do so, to a locking position.

*The transfer mechanism.*—Every time one of the figure-rolls 9 of the accumulator moves from "9" to "0," the next figure-roll to the left must be actuated one unit-space to complete the computation, and this is accomplished by causing a projection 24ª on a plate 24 (which is fastened to the main gear 5, to the right) to abut against and actuate an arm 25 into a raised position, as shown in Fig. 15. When this arm 25 is raised, a plate 26 is released therefrom and a spring 27 causes the plate 26 to be swung on its fulcrum 28. Attached to the forward end of the plate is a pawl 29 which will be moved back one tooth in a ratchet 30 forming a part of the main gear 5, and this actuates the figure-roll which is to the left. If the pull-handle of the calculating attachment is now operated, the shaft 3 will be revolved. This shaft is provided with cams 31 which are spirally arranged and which will move the plate 26 back to its normal position, whereupon the arm 25 will be caused again to lock or hold the plate 26, and the pawl 29 will have moved the ratchet 30 and, thus, the gear 5 and figure-wheel 9 to the left one unit-space. A spring 32 will cause the arm 25 to be lowered when the projection 26ª of plate 26 passes the locking surface on the arm.

The cams 31 are so placed on the shaft 3 and are so timed in their movement as to advance beyond the plate 26 on the initial pull of the handle 22 when a computation is being produced in both the calculating attachment and in the accumulator. When the accumulator is moved out of mesh with the calculating attachment, as explained above, the pull-handle 22, or an auxiliary handle 33, is again operated, and this action will cause the cams 31 again to be rotated. This effects a return of the plates 26 that have been released to their normal position, and this movement of the plates will cause the pawls to move the ratchet on the main gear to the left of the plate which is being moved and, thus, the figure-wheels one unit-space.

When an amount is being transferred to the accumulator by the zero-producer of the calculating attachment, only one pull of the handle 22 or of the auxiliary handle 33 is necessary. Detents 30ª will prevent the ratchets 30 and their connecting parts from retrograde movement by reason of the drag of pawls 29 when the plates 26 are rising, and this detent will maintain the gears in meshing position and against movement due to friction of other moving parts, and this will cause the proper seating of the ratchets should there be any overthrow.

After the required amounts have been accumulated in the accumulator and the total has served its purpose, such total may be eliminated by means of the following mechanism: A lever 34 is retained in its normal position by a pin 35. When zeros are desired, this lever is slightly pressed to the right to raise it from the pin 35, and then rotated to the rear. This action will cause a pinion 36 to be revolved. As the pinion is attached to a shaft 36ª, this causes its rotation. Each ratchet 30 is provided with internal teeth 37 adapted to be engaged by a pawl 38 carried by a plate 39 that is keyed to the shaft 36ª. Placed between the plate 39 and the gear 5 is a collar 39ª provided with a spring 40 which will cause the pawl 38 to hug the inner edge of the ratchet. Therefore, when the lever 34 is operated and the shaft 36ª is thereby rotated, the pawl 38 will slip along the inner surface of the ratchet until it enters one of the internal teeth 37 therein and then cause rotative action of the ratchet and, consequently, of the main gear 5 and the figure-wheel 9. These pawls aline the internal teeth of the ratchets in a position wherein all the figure-wheels will show zeros through the sight-opening 41 in the accumulator-casing. Should any of the transfer-plates 26 be in a raised position when the zero-producer is actuated, the edge of plate 39 will force it to its lower or normal position by reason of the edge 42 camming the plate 26 to this lowermost position and wherein the lever 25 will hold it until again unlocked.

Means are preferably provided to close the sight-opening 41 whenever one or more of the transfer mechanisms are set. When one of these mechanisms is set, the lever 25 is raised and abuts against a bar 43 which overlies all of the levers 25 and moves the same, whereupon the sight-opening is closed. The bar 43 is attached to an arm 44 fulcrumed to the side-plate of the accumulator and is provided with a slot 44ª. Fulcrumed on a shaft 46 is a plate 47 provided with an angular portion 48ª which will cover or close the sight-opening when the plate 47 is revolved. This plate is provided with a pin 49 which rests in the slot 44ª.

From the foregoing, it will be clear that whenever one of the arms 25 is in its raised position, the angular portion 48ª of the plate 47 is directly behind the sight-opening 41 being an unmistakable indication that the computation is not complete, but which result can be obtained by operating the pull-handle 22 or the auxiliary handle 33. This action returns the transfer mechanisms to normal position and, thus, the levers will be moved to their lowermost position and, thereby, the angular portion of plate 47 will be moved away from the sight-opening. When the figure-wheels are in sight, it is a certain indication that the computation is complete.

The pull-handle mechanism, when operated, causes a gear 50 to be revolved one-quarter turn. Meshing with this gear is an intermediate gear 51 which drives a gear 52 one revolution each time that the handle 22 is operated.

The accumulator is provided with a finger-button 53 upon which the operator presses when it is desired to move the accumulator into operating relation with the calculating attachment.

The setting lever 10 will cause the accumulator to be moved into operating relation with the calculating attachment whenever it is shifted to the subtracting position by means of a connecting link 54. This link may be disconnected or made ineffective by unhooking the same.

The adding and subtracting lever 10 is connected to the zero-producing lever 20 of the calculating attachment by a link 55, in such manner as to move the adding and subtracting lever to the adding-position when the zero-producing lever is operated, provided the adding and subtracting lever is in other than the adding-position. This link 55 is provided with an elongated slot 56, to permit the adding and subtracting lever 10 to be moved without disturbing the zero-producing lever.

The mechanism herein disclosed, when used in conjunction with the cross-adding computer revealed in my aforementioned Patent No. 1,295,396, provides means for producing the cross total of each line of figures and also a grand total of all the lines.

This mechanism, used in combination with a plurality of calculating attachments and a cross-footing computer, provides means for producing, first, the total of each column of figures; secondly, a grand total of all columns; thirdly, a cross-total of each line; and, fourthly, the accumulated totals of a plurality of sheets of work.

A modified form of this device which I contemplate would dispense with the connections from the pull-handle of the calculating attachment to the shaft 3 and to replace these actuating-means by disposing the handle 33 on the end of said shaft. This would provide means whereby the movement of the transfer mechanisms of the accumulating machine could be completed independently of the calculator actuating means.

What I claim is:

1. The combination with a typewriter, of a calculating attachment mounted thereon and partially operable thereby, an accumulating-attachment mounted on the calculating attachment and operable thereby independently of the operation of the typewriter, and means for simultaneously completing the actuation of the calculating-attachment and effecting operation of the accumulating-attachment.

2. The combination of a typewriter, a calculating attachment mounted thereon and adapted to be initially operated thereby, an accumulating attachment mounted on said calculating attachment, means mounted on said calculating attachment for completing the operation of said calculating attachment and at the same time to cause operation of said accumulating attachment, and independent means for operating said accumulator.

3. The combination of a typewriter, a calculating-attachment mounted thereon and partially operable thereby, an accumulating-structure mounted for movement on the calculating-attachment as a device structurally distinct from that attachment and positionable in operative relation thereto, and operable independently of the operation of the typewriter, means for positioning said structure with respect to the attachment, and means distinct from the typewriter for completing the operation of the calculating-attachment and simultaneously operating the accumulating structure to effect computations.

4. In a calculating-machine, a plurality of sets of independently movable denominational wheels, each set being operable for producing a total of a series of amounts, the wheels of one set being disposed approximately in vertical alinement with those of another set, means associated with each set for effecting their co-action but normally inactive, zero-producing means for each set of wheels, one of the zero-producing means being operable for producing zeros on one set of wheels and for simultaneously producing an additive computation on another set thereof, and zero-producing means independent of said first-mentioned means.

5. In a calculating machine, two sets of denominational wheels operatively associated but normally disconnected one from the other, means disposable into active position by the bodily movement of one set in respect to the other for effecting coaction thereof, means for producing an additive computation on one of said sets simultaneously with a subtractive operation of the other set.

6. The combination with a typewriter and the printing keys thereof, of a calculating attachment mounted on the typewriter and provided with denominational wheels to show the result of additive and subtractive operations as conjointly performed by the typewriter and calculating attachment, and an accumulating machine adapted to be operated by the calculating attachment to perform mathematical operations and provided with denominational wheels to show the result thereof, said calculator attachment being operable independently of the accumulating machine.

7. The combination with a typewriter and the printing keys thereof, of a calculating attachment mounted on the typewriter and initially operated by the keys to effect a selection only, separate means carried by the calculating attachment to complete actuation of the calculating attachment to produce a computation, an accumulating machine mounted on said calculating attachment and normally out of operative relation therewith when said calculating attachment is producing a computation but movable into relation therewith and operable thereby when the calculating attachment is operated, said calculator attachment being operable independently of the accumulating machine.

8. The combination with a typewriter and the printing keys thereof, of a calculating attachment mounted thereon and including selecting and actuating means, said selecting means being operable by the typewriter keys to effect a selection, and said actuating means being operable to cause operation of said selecting means to produce a computation, and an accumulating machine mounted on said calculating attachment and normally out of operative relation therewith when said selection is being made but shiftable into operative relation therewith before said actuating means is operated to produce an accumulated computation, said calculator attachment being operable independently of the accumulating machine.

9. The combination with a typewriter and the printing keys thereof, of a calculating attachment mounted on said typewriter and including means operable by said keys to effect a selection only and separate means for causing actuation of said selected means to produce additive or subtractive computations, and a normally inoperative accumulating machine arranged in juxtaposition to said calculating attachment and positionable in operative relation thereto for actuation thereby, said calculator attachment being operable independently of the accumulating machine.

10. The combination with a flat-platen typewriter including a line-spacing carriage and a letter-spacing carriage, a calculating attachment comprising components independently mounted on each of said carriages, and an accumulating machine mounted on the line-spacing carriage component of the calculating attachment and normally operatively disengaged from the same but positionable into operative engagement therewith, said calculator attachment being operable independently of the accumulating machine.

11. The combination of a typewriter, a calculating-attachment provided with denominational-wheels, unit-transfer mechanisms therefor, an accumulating machine operatively associated with the attachment and provided with denominational-wheels and unit-transfer mechanisms therefor and settable for effecting a carrying-operation, means associated with the denominational-wheels of the accumulating machine for temporarily masking the numerals thereof whenever a unit-transfer mechanism of the accumulating machine has been set to effect a carrying-operation, the masking means comprising an oscillatable element provided with an opening-covering portion, an element-actuating member operatively connected to the element, and instrumentalities rendered active by operation of the transfer mechanism for moving the element, and means for effecting such a carrying-operation and thereby operate the masking means whereby the numerals of the wheels will be disclosed to view.

12. The combination, in a machine of the kind described, of a calculating machine capable of performing additive and subtractive computations, means operable into any of a plurality of operative positions for predetermining the required mathematical operation, an accumulating machine shiftable into operative engagement with the calculating machine when the predetermining means is in one of its operative positions, and means normally inactive to move the accumulating machine for preventing it from being brought into operating engagement with the calculating machine when the predetermining means is in another of its operative positions.

13. The combination, in a machine of the kind described, of a calculating-machine operable to perform additive and subtractive computations, means actuatable into any of a plurality of operative positions for predetermining the required computative operation, an accumulating machine shiftable into operative engagement with the calculating-machine when the computation predetermining-means is in one of its operative conditions, and means operable to maintain disengagement of the accumulating machine from the calculating machine when the computation-predetermining means is in another of its plurality of positions.

14. The combination of a typewriter, a calculating attachment mounted thereon, actuating means for the calculating attachment, an accumulating machine mounted on said calculating attachment and adjustable into a plurality of positions in relation thereto, a latch adapted to hold said accumulator in one position, actuating means for the calculating attachment adapted to unlock the latch, springs for moving the accumulator to the other position when released, and means for completing the actuation of both the calculating attachment and the accumulating machine to produce a computation.

15. The combination of a typewriter, a calculating attachment mounted thereon, actuating means for the calculating attachment, an accumulating machine mounted on said calculating attachment and positionable into at least two positions in relation to said calculating attachment, a latch for holding said accumulator in one position, springs for moving it to and holding it in the other position, the actuating means for the calculating attachment being arranged to unlock said latch whereby said springs may move the accumulator, and means other than the actuating means for the calculating attachment for unlocking the latch.

16. The combination with a typewriter and the printing keys thereof, of a calculating attachment mounted on the typewriter and controlled by the keys thereof and including actuatable parts, means carried by the calculating attachment for causing actuation of the key-controlled parts to produce mathematical computations, an accumulating machine mounted on the calculating attachment and operable thereby, and means whereby said calculating attachment may be operated independently of the accumulating machine.

17. In a machine of the kind described, the combination of a plurality of sets of independently movable figure-wheels, a plurality of zero-producing mechanisms, each capable of producing zeros on one of said sets of figure-wheels, one of said mechanisms being capable of producing zeros on one of said sets of figure-wheels and a selection on another of said sets of figure-wheels.

18. The combination with a calculating attachment, of an accumulating machine mounted thereon to receive and accumulate amounts transferred therefrom in different ways, and including a zero-producer, first, by placing the accumulator in operative engagement with the calculating attachment when a total subtractive operation is being performed, secondly, by placing the accumulator in operative engagement with the calculating attachment when zeros are being produced by the zero-producer, and thirdly by actuation of a direct zero producing instrumentality.

19. The combination, in a calculating machine, of means for predetermining the style of computation, zero-producing means for effecting a zero-producing operation in the calculating machine, and a device connecting the zero-producing means and the predetermining means for moving one of said means when the other is operated.

20. The combination, in a calculating machine including figure-wheels, of a lever positionable into a plurality of positions for predetermining the style of computation to be performed, means for returning the figure-wheels to zero-position, and means connecting with the zero-producing means and the lever whereby the latter will be automatically moved when the former is operated.

21. The combination, in a calculating machine including instrumentalities adapted to produce additive and subtractive computations, a lever positionable into one position for effecting an additive computation on said instrumentalities and positionable into another position for effecting a subtractive computation therein, an accumulating machine positionable into operative engagement with the calculating machine, zero-producing means for said calculating machine, and means connecting said lever with the zero-producing means whereby such means, when operated, will move the lever to the adding position, said zero-producing means also operating to release the accumulator from operative engagement with the calculating machine.

22. The combination with a typewriter, of a calculating-attachment mounted thereon and initially operable thereby, an accumulating-attachment mounted on the calculating-attachment and including figure-members, means for completing the operation of the calculating-attachment and simultaneously to cause operation of the accumulating-attachment to effect computations, means normally inactive but capable of operation during the operation of the accumulating-attachment for masking the figure-members thereof, and means for then again disclosing the figure-members to view, said calculating-attachment being operable independently of the accumulating-attachment.

23. The combination with a typewriter, of a calculating-attachment mounted thereon and initially operable thereby, an accumulating-attachment mounted on the calculating-attachment, means for completing the operation of the calculating-attachment and simultaneously to cause operation of the accumulating-attachment to effect a plurality of computations, a lever for predetermining the character of computation to be effected on the calculating-attachment, means operated by the lever for preventing coaction of the calculating and accumulating attachments, and means also operated by the lever for causing operative connection to be established between the two attachments.

24. The combination with a typewriter, of a calculating-attachment mounted thereon and initially operable thereby, an accumulating-attachment mounted on the calculating-attachment, means for completing the operation of the calculating-attachment and simultaneously to cause operation of the accumulating-attachment to effect a plurality of computations, a lever having a plurality of selective positions for predetermining the character of computation to be effected on the calculating-attachment, means operated by the lever for preventing coaction of said calculating and accumulating attachments when the lever is in one of its selective positions and for effecting coöperation of the two attachments when the lever is in another of its selective positions, means for locking the two attachments in operative relation, and means for automatically unlocking and disengaging the attachment.

25. The combination with a typewriter, of a calculating-attachment mounted thereon and initially operable thereby, an accumulating-attachment mounted on the calculating-attachment, means for completing the operation of the calculating-attachment and simultaneously to cause operation of the accumulating-attachment to effect a plurality of computations, said calculating-attachment being operable independently of the accumulating-attachment, a lever for determining the character of computation to be effected, zero-producing mechanism, means connecting the lever and zero-producing mechanism for conjoint operation, means operated by the lever for preventing conjoint operation of the calculating and accumulating attachments and operable to permit engagement thereof for conjoint operation, a latch for holding the two attachments in operative relation, the zero-producer being operable to effect a computation on both the calculating and accumulating attachments and to release the accumulating-attachment from the calculating-attachment and to move the computation-determining lever to another position.

26. The combination, in a calculating-machine, of means for predetermining the character of computation, zero-producing means for effecting a zero-producing operation in the calculating-machine, a connection between the computation-predetermining means and the zero-producing means, an accumulator mounted on and adapted to be operatively engaged with the calculating-machine, a latch for holding the machine and accumulator in operative engagement, and means for disengaging the machine and accumulator when the latch is released; the zero-producing means being operable to effect a computation in both the calculating-machine and accumulator, an unlatching of the locking means, and a shifting of the computation-predetermining means.

27. The combination with a typewriter, of a calculating-attachment mounted thereon and initially operable thereby, an accumulating-attachment mounted on the calculating attachment, means for completing the operation of the calculating and accumulating attachments when operatively engaged to effect a plurality of computations, carrying-mechanisms for the calculating and accumulating attachments, means for disengaging the two attachments during the operation of effecting computations, and means for thereafter causing the carrying-mechanisms to be operated, the calculating-machine being operable independently of operation of the accumulating attachment.

In testimony whereof I affix my signature in presence of two witnesses.

EDWARD C. WALTER.

Witnesses:
JOHN J. DOWLING,
FRANK N. BENTON.